(No Model.) 3 Sheets—Sheet 1.
C. LANKER.
POTATO DIGGER AND HARVESTER.
No. 453,909. Patented June 9, 1891.
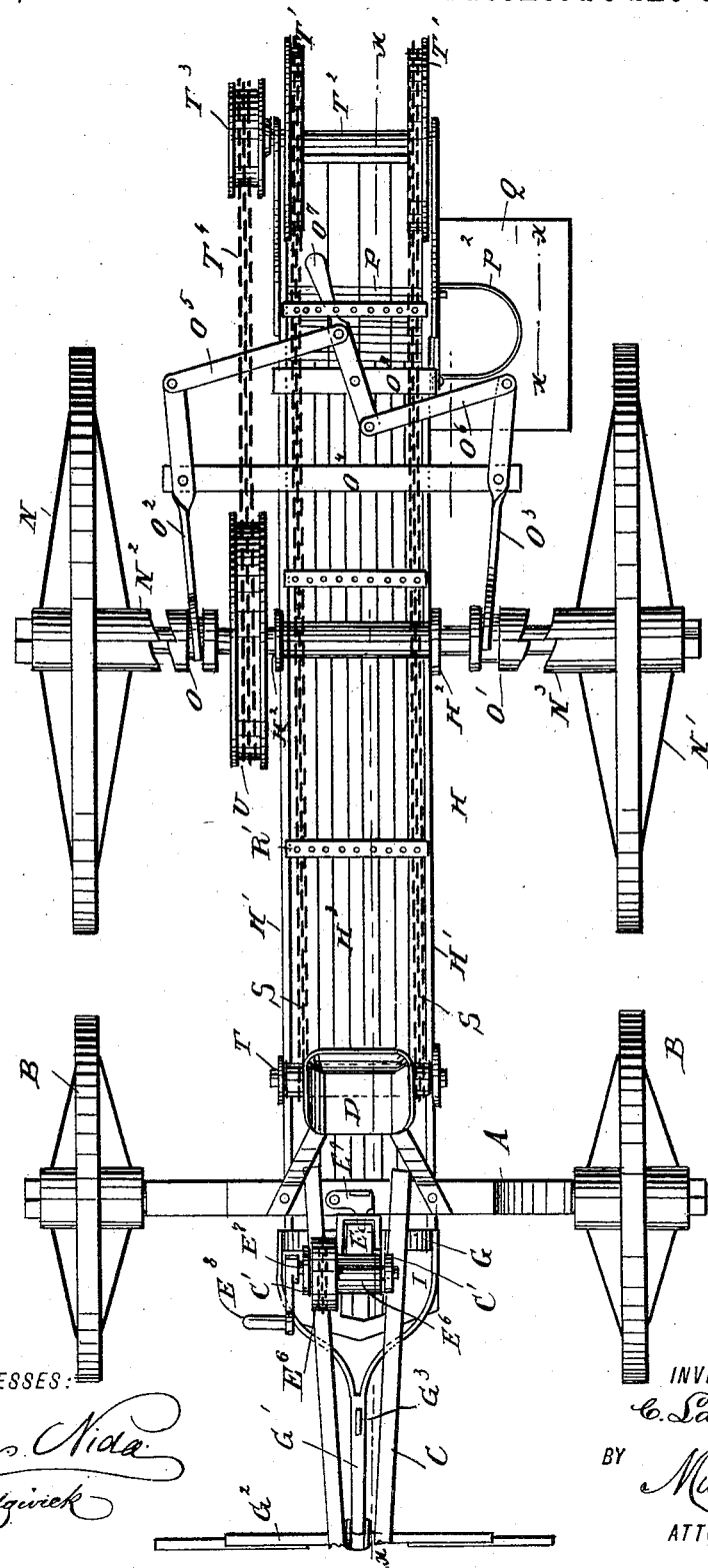
WITNESSES:
Chas. Nida
C. Sedgwick
INVENTOR:
C. Lanker
BY Munn & Co.
ATTORNEYS

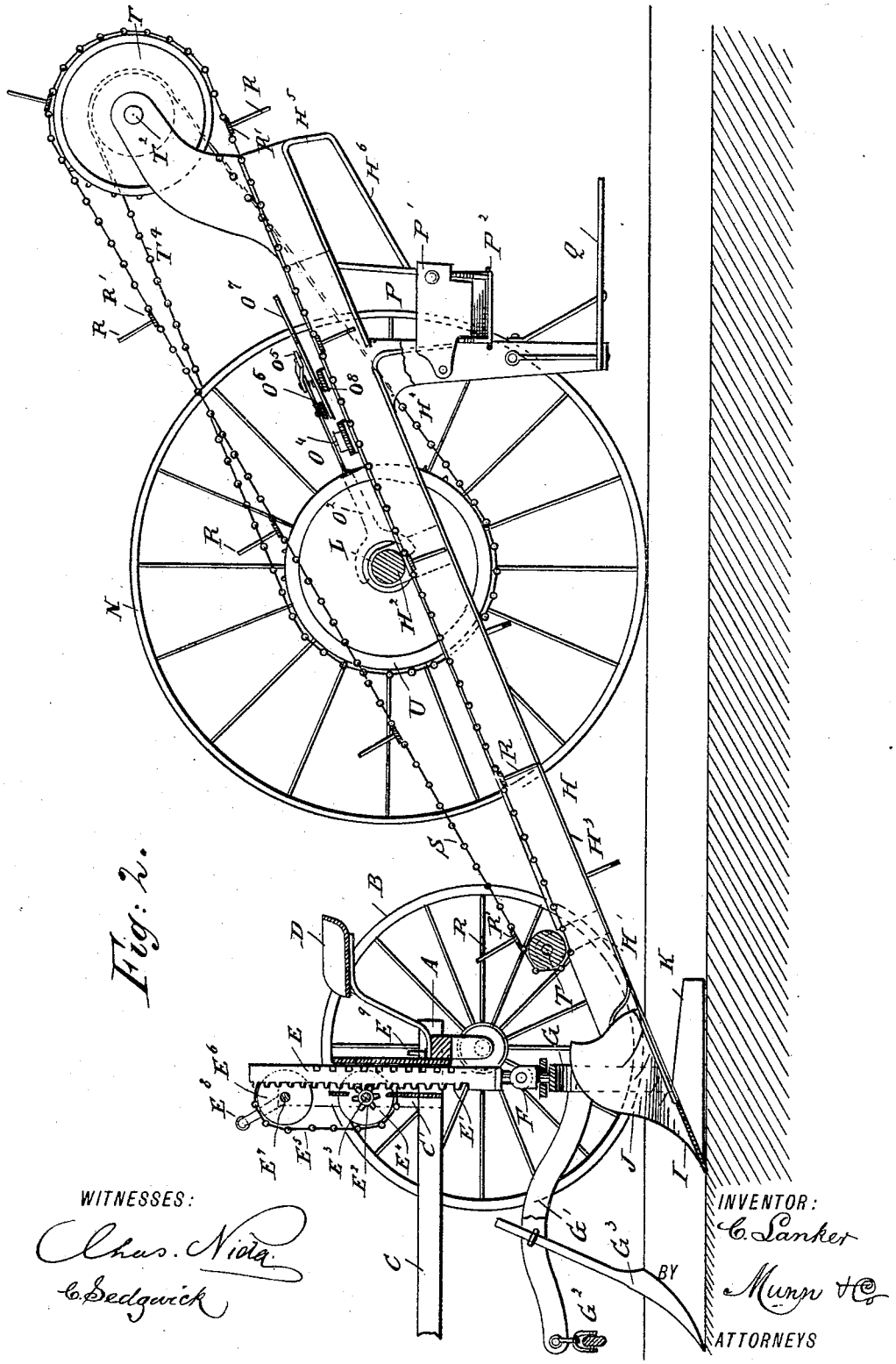

(No Model.) 3 Sheets—Sheet 3.
C. LANKER.
POTATO DIGGER AND HARVESTER.
No. 453,909. Patented June 9, 1891.
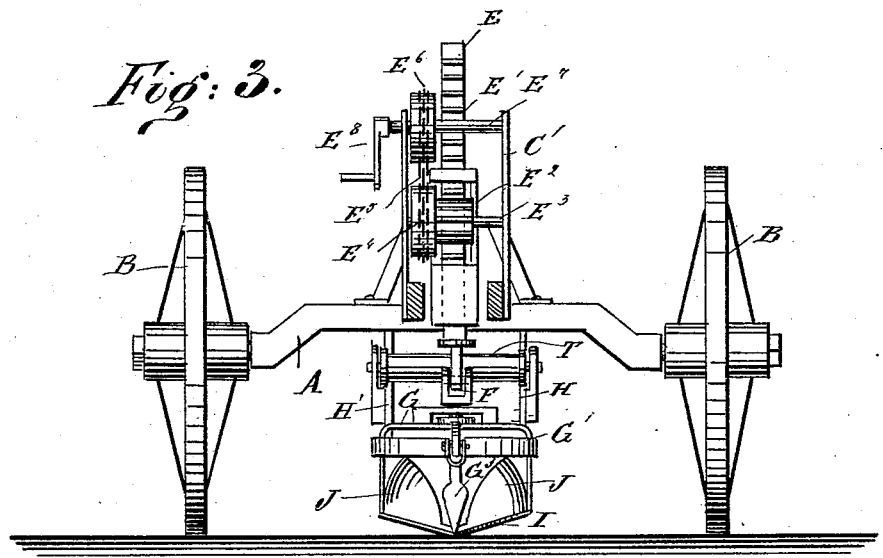
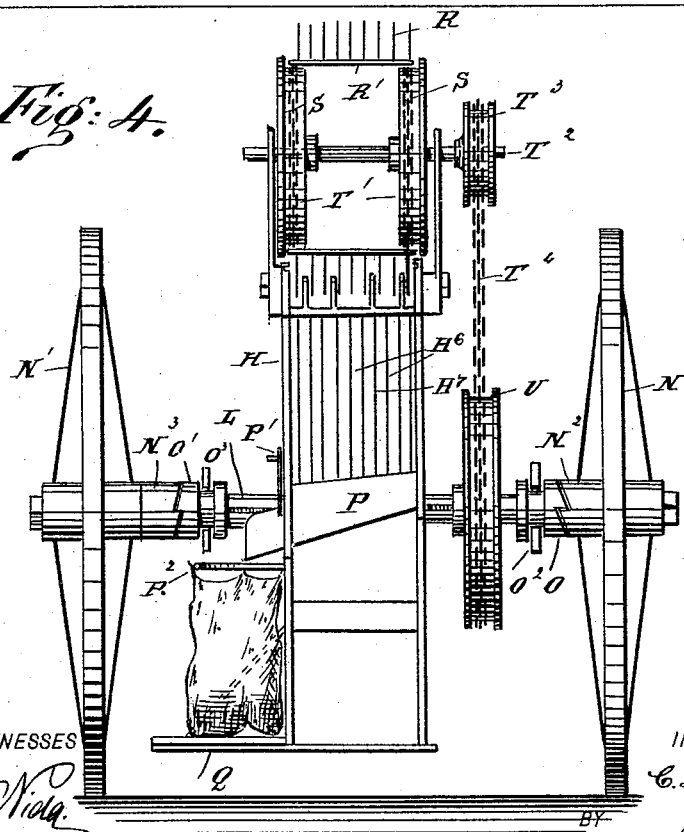

UNITED STATES PATENT OFFICE.

CLINTON LANKER, OF ST. JOSEPH, MISSOURI.

POTATO DIGGER AND HARVESTER.

SPECIFICATION forming part of Letters Patent No. 453,909, dated June 9, 1891.

Application filed August 27, 1890. Serial No. 363,372. (No model.)

*To all whom it may concern:*

Be it known that I, CLINTON LANKER, of St. Joseph, in the county of Buchanan and State of Missouri, have invented a new and Improved Potato Digger and Harvester, of which the following is a full, clear, and exact description.

The object of the invention is to provide a new and improved potato digger and harvester which is simple and durable in construction, very effective in operation, readily removing the potatoes, separating them from the soil and weeds, and delivering the cleaned potatoes to bags or other receptacles carried on the machine.

The invention consists of a plow having a double mold-board and discharging onto an inclined elevator provided with raking-arms adapted to travel over the grated bottom of the elevator to carry the potatoes upward, and a discharge-spout arranged transversely below the elevator.

The invention also consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line $x$ $x$ of Fig. 1. Fig. 3 is a front view of the improvement, and Fig. 4 is a rear end view of the same.

The improved potato digger and harvester is provided with a front axle A, on which are mounted to turn loosely the front wheels B, and which also carries the tongue C for guiding the front wheels. The axle A also supports the driver's seat D, and is provided with vertically-arranged bearings for a post E, connected by a universal joint F with a saddle G, fastened at its ends to the side-boards H' of an elevator H, extending longitudinally upward and rearward.

On the lower part of the elevator H is secured a plow I, on the sides of which are arranged two inwardly-inclined mold-boards J, provided on their outer sides with landsides K, so that the ground dug up by the plow I is thrown by the mold-boards J onto the lower end of the elevator H. In order to loosen the ground in front of the plow I a cutting-bar
$G^3$ may be employed, secured in a draft-arm
$G'$, projecting from the saddle G, and also carrying the doubletree $G^2$, to which the animals for drawing the machine are hitched.

In order to raise or lower the post E, so as to hold the plow I to a greater or less depth in the ground, the said post is provided with rack-teeth $E'$, meshing into a pinion $E^2$, secured on a transversely-extending shaft $E^3$, mounted to turn in suitable brackets $C'$, fastened to the tongue C. On one end of the shaft $E^3$ is secured a sprocket-wheel $E^4$, over which passes a sprocket-chain $E^5$, also passing over a sprocket-wheel $E^6$, secured on the shaft $E^7$, mounted to turn in suitable bearings in the upper part of the brackets $C'$ and carrying at its outer end a crank-arm $E^8$ for conveniently turning the said shaft, so as to turn the sprocket-wheels $E^6$ and $E^4$ to rotate the pinion $E^3$, in order to raise and lower the post E. A suitable locking device may be employed to fasten the post E in any desired position after being adjusted. As shown in the drawings, the locking device $E^9$ consists of a pivoted pawl adapted to be operated by the foot of the driver and adapted to engage one of a series of recesses or grooves formed in the back of the post E.

The elevator H is provided on its sideboards $H'$ with upwardly-extending bearings $H^2$, held on the rear axle L, carrying loosely the rear driving-wheels N and $N'$. The inner ends of the hubs of the said driving-wheels are formed with clutch-teeth $N^2$ and $N^3$, adapted to be engaged by clutches O and $O'$, respectively, mounted to turn and to slide on the rear axle L, and actuated by shifting-levers $O^2$ and $O^3$, respectively, fulcrumed on the transverse bracket $O^4$, secured in the side-boards $H'$ of the elevator. The rear ends of the shifting-levers $O^2$ and $O^3$ are pivotally connected by links $O^5$ and $O^6$, respectively, with a hand-lever $O^7$, pivoted on a bar $O^8$, and under the control of the operator to permit the latter to throw the driving mechanism into and out of gear whenever desired, and as hereinafter more fully described.

The bottom of the elevator H is formed of a series of longitudinally-extending rods $H^3$, forming a grated bottom, over which pass the potatoes, earth, and weeds to be separated, the earth falling through the bars to the ground below. Every alternate grate-bar $H^3$ does not extend quite to the upper end of the elevator and is bent downward at $H^4$, leading to a transverse chute P, held on the under side of the elevator, and onto which the potatoes drop after leaving the short grate-bars $H^3$. On the lower end of the transverse chute P is fulcrumed a gate P', and in front of the same is arranged a bag-holder $P^2$ for conveniently supporting a bag into which discharges the lower end of the chute P when the gate P' is opened. When a bag is filled with potatoes, the gate P' is closed, so as to enable the operator to conveniently exchange the full bag for an empty one, after which the gate is opened again and the potatoes accumulated in the chute P pass into the empty bag. The longer grate-bars $H^3$ continue to the upper end of the elevator and are then bent downward at $H^5$, as is plainly shown in Fig. 2, to permit the weeds to pass over this upper end of the elevator and drop onto the ground. The bars are then extended forward and downward, as at $H^6$, to connect with the rear side of the transverse chute P, and to carry large potatoes dropping between the upper longer bars $H^3$ back to the chute P, intermediate short bars $H^7$ being arranged between the return-bars $H^6$ for this purpose.

Under the lower end of the transverse chute P is arranged a platform Q, supported by suitable brackets from the elevator H and serving to support an operator and the bottoms of the bags into which the potatoes are filled. In order to move the potatoes and weeds up the elevator, raking arms R are provided secured on the transversely-arranged bars R', placed suitable distances apart and secured on two endless chains S, passing over a transversely-extending pulley T, arranged on the lower part of the elevator H across the tops of the side-boards. The endless chains S also pass over pulleys T', secured on a shaft $T^2$, mounted to turn in suitable bearings secured to the upper ends of the side-boards H' of the elevator H.

On one end of the shaft $T^2$ is secured a sprocket-wheel $T^3$, over which passes a sprocket-chain $T^4$, also passing over a sprocket-wheel U, secured on the rear axle L. Thus when the latter is rotated a rotary motion is imparted to the sprocket-wheel U, which transmits its motion by the chain $T^4$ to the sprocket-wheel $T^3$, so that the shaft $T^2$ is revolved, the motion of the latter causing the pulley T' to rotate, so that the chains S are set in motion simultaneously and carry the raking-arms R through the elevator H above the grate-bars. The lower ends of the raking fingers or arms R preferably extend between the grate-bars so that the latter cannot become clogged by the dirt or potatoes.

The operation is as follows: One of the operators is seated in the seat D to manage the animals for driving the machine and also to raise and lower the plow according to the condition of the ground. Another operator, standing on the platform Q, manipulates the bags into which the potatoes are filled. When the machine is drawn forward, the operator, by first releasing the locking device $E^9$ and turning the crank-arm $E^8$, can raise or lower the plow I, according to the depth at which the potatoes are held in the ground. When the machine is dragged forward, the earth, with the potatoes, tops, and weeds, passes up the plow I and is directed toward the rear onto the grated bottom of the elevator H by the mold-boards J. The loose earth soon falls through the grated bottom while the potatoes and weeds are carried upward by the raking-fingers R on the traveling chains S, until the potatoes are finally passed over the short grate-bars $H^3$ into the chute P, and from the latter into the bag or other suitable receptacle held at the lower end of the chute. The weeds are carried still farther upward and rearward by the raking fingers over the longer grate-bars $H^3$, to be finally dropped over the downwardly bent parts $H^5$ of the said grate-bars to the ground.

It will be seen that the direction of the machine can be readily changed by the animals pulling the plow, as the front wheels are guide-wheels and their axle is universally jointed with the front end of the elevator H carried on the rear axle L. When the machine is not in use but is being transported from one place to another, the operator turns the crank-arm $H^3$ so as to raise the plow I above the ground over which the machine is to pass. The operator also moves the lever $O^7$ so that the shifting-levers $O^2$ and $O^3$ are actuated and the clutches O and O' are thrown out of gear with the driving-wheels N and N', so that the latter rotate on the forward motion of the machine without setting the endless chains S and the raking-fingers R in motion. It will further be seen that the machine is very simple and durable in construction and completely separates the potatoes from the earth and weeds, at the same time delivering the clean potatoes to a suitable bag or other receptacle.

Having thus described my invention, what I claim as new, and desire to secure by Letters Patent, is—

1. In a potato digger and harvester, the combination, with an elevator supported on the rear axle, of a front axle universally connected with the lower end of the said elevator, and a plow secured to the lower end of the said elevator, substantially as shown and described.

2. In a potato digger and harvester, the combination, with an elevator supported on the rear axle, of a front axle universally connected with the lower end of the said elevator, a plow secured to the lower end of the said elevator, and mold-boards arranged on the sides of the said plow and adapted to discharge onto the lower end of the said elevator, substantially as shown and described.

3. In a potato-digger, an elevator having its bottom formed of longitudinally-extending rods or bars, every alternate one of which terminates short of the upper end of the elevator, the ones extending to the end of the elevator being extended downwardly and forwardly under the elevator, substantially as and for the purpose set forth.

4. In a potato digger and harvester, the combination, with an elevator provided with traveling fingers and a grated bottom over which pass the said fingers, of a fixed plow held on the lower end of the said elevator, mold-boards on the sides of the said plow and discharging onto the lower end of the said grated bottom, and a transverse chute arranged under the said grated bottom and into which open some of the bars of the grated bottom, the other bars being continued to form a passage for the weeds, substantially as shown and described.

5. In a potato digger and harvester, the combination, with an elevator provided with traveling fingers and a grated bottom over which pass the said fingers, of a fixed plow held on the lower end of the said elevator, mold-boards on the sides of the said plow and discharging onto the lower end of the said grated bottom, a transverse chute arranged under the said grated bottom and into which open some of the bars of the grated bottom, the other bars being continued to form a passage for the weeds, and means, substantially as described, for actuating the fingers of said elevator from the main driving-wheel, substantially as shown and described.

6. In a potato digger and harvester, the combination, with an elevator provided with traveling fingers and a grated bottom over which pass the said fingers, of a fixed plow held on the lower end of the said elevator, mold-boards on the sides of the said plow and discharging onto the lower end of the said grated bottom, a transverse chute arranged under the said grated bottom and into which open some of the bars of the grated bottom, the other bars being continued to form a passage for the weeds, and a gate held on the said transverse chute, substantially as shown and described.

7. In a potato digger and harvester, the combination, with a rear axle and driving-wheels mounted thereon, of an inclined elevator supported on the said rear axle and adapted to be actuated from the said main driving-wheels, a saddle secured on the lower end of the said elevator, and a vertically-adjustable post universally connected with the said saddle, and a front axle carrying the said post, substantially as shown and described.

8. In a potato digger and harvester, the combination, with a rear axle and driving-wheels mounted thereon, of an inclined elevator supported on the said rear axle and adapted to be actuated from the said main driving-wheels, a saddle secured on the lower end of the said elevator, a vertically-adjustable post universally connected with the said saddle, a front axle carrying the said post, and means, substantially as described, for raising and lowering the said post, as set forth.

9. In a potato digger and harvester, the combination, with a rear axle and driving-wheels mounted thereon, of an inclined elevator supported on the said rear axle and adapted to be actuated from the said main driving-wheels, a saddle secured on the lower end of the said elevator, a vertically-adjustable post universally connected with the said saddle, a front axle carrying the said post, means, substantially as shown and described, for raising and lowering the said post, and a locking device for holding the said post in position when adjusted, substantially as shown and described.

10. In a potato digger and harvester, the combination, with a rear axle and driving-wheels mounted thereon, of an inclined elevator supported on the said rear axle and adapted to be actuated from the said main driving-wheels, a saddle secured on the lower end of the said elevator, a vertically-adjustable post universally connected with the said saddle, a front axle carrying the said post, a plow secured to the lower end of the said elevator and projecting in front of the said saddle, and mold-boards arranged on the sides of the said plow and adapted to discharge on the lower end of the elevator, substantially as shown and described.

11. In a potato digger and harvester, the combination, with a rear axle and driving-wheels mounted thereon, of an inclined elevator supported on the said rear axle and adapted to be actuated from the said main driving-wheels, a saddle secured on the lower end of the said elevator, a vertically-adjustable post universally connected with the said saddle, a front axle carrying the said post, a plow secured to the lower end of the said elevator and projecting in front of the said saddle, mold-boards arranged on the sides of the said plow and adapted to discharge on the lower end of the elevator, and a draft-bar secured to the said saddle, substantially as shown and described.

CLINTON LANKER.

Witnesses:
L. A. EATON,
M. M. CRANDALL.